United States Patent [19]

Nossen

[11] Patent Number: 4,710,944
[45] Date of Patent: Dec. 1, 1987

[54] DUAL TRANSMIT-RECEIVE SPACE DIVERSITY COMMUNICATION SYSTEM

[75] Inventor: Edward J. Nossen, Camden County, Cherry Hill Township, N.J.

[73] Assignee: RCA Corporation, Princeton, N.J.

[21] Appl. No.: 920,218

[22] Filed: Oct. 17, 1986

[51] Int. Cl.[4] .......................... H04L 1/06; H04B 7/04
[52] U.S. Cl. ..................................... 375/40; 375/100; 455/52; 455/69
[58] Field of Search .................. 375/40, 58, 100, 104; 455/50, 52, 63, 65, 69, 132, 133

[56]          References Cited
        U.S. PATENT DOCUMENTS

| | | | |
|---|---|---|---|
| 3,209,260 | 9/1965 | Young, Jr. | 455/52 |
| 3,214,691 | 10/1965 | Sproul et al. | 375/40 |
| 3,401,340 | 9/1968 | Cronburg, Jr. et al. | 325/304 |
| 3,717,814 | 2/1973 | Gans | 325/56 |
| 4,035,728 | 7/1977 | Ishikawa et al. | 325/304 |
| 4,513,412 | 4/1985 | Cox | 370/29 |
| 4,539,710 | 9/1985 | Dinsmore | 455/134 |
| 4,564,935 | 1/1986 | Kaplan | 370/38 |
| 4,593,413 | 6/1986 | Ozaki | 455/139 |

OTHER PUBLICATIONS

Article entitled "Space-Diversity Engineering", by A. Vigants, published at pp. 103-142, in The Bell System Technical Journal, vol. 54, No. 1, Jan. 1975.

Primary Examiner—Robert L. Griffin
Assistant Examiner—Andrew J. Telesz, Jr.
Attorney, Agent, or Firm—Clement A. Berard, Jr.; William H. Meise

[57]          ABSTRACT

A transmit/receive space diversity system communicates between transmitter-receivers at two separate sites. Each site has at least two antennas. Each antenna at a first one of the sites transmits a pilot signal, at differing frequencies. At the second or other site, all the pilot signals are received by each antenna, and the pilot signals are evaluated to determine which pilot-signal-receiving antenna is part of the lowest loss path between the sites. A data source at the second site is routed to the identified antenna for transmission of data signals back to the first site. At the first site, the data signals are received by all the antennas, and the best of the received data signals is routed to utilization apparatus. A data signal from the first site is transmitted to the second site, at which it is received by the selected antenna.

11 Claims, 8 Drawing Figures

FREQUENCY GHz

DUAL TRANSMIT-RECEIVE SPACE DIVERSITY COMMUNICATION SYSTEM

This invention relates to communication systems in which both transmitter and receiver use space diversity.

BACKGROUND OF THE INVENTION

The high data communication rates required of modern communication systems often require point-to-point electromagnetic transmission. Because of the high data rates now in common use, the bandwidths of the signals to be transmitted may be large. In order to accommodate these bandwidths, it has become common to modulate the signals to be transmitted onto microwave carriers and to transmit the signals at microwave or millimeter-wave frequencies corresponding to about three gigahertz (GHz) and above. A major problem with point-to-point communication systems of this sort is occasional loss of signal or fading due to multipath propagation arising from anomalous atmospheric conditions. For many applications, the resulting interruption of communication is undesirable, and several methods have been used to ameliorate the condition. One method for combatting fading in a point-to-point communication scheme is to use frequency diversity. In frequency diversity, the same data is modulated onto carriers of different frequencies, and transmitted simultaneously over the same path. At the receiver, the received signals are demodulated, and the strongest or otherwise best demodulated signal is routed to the utilization apparatus. While very effective, frequency diversity tends to be wasteful of frequency spectrum. Dual frequency diversity, for example, results in a doubling of spectrum use. For narrowband signals, this may not be a problem. When several signals having a bandwidth on the order of 1 GHz are to be transmitted, the spectrum which must be allocated in a frequency diversity context may not be available.

Another method for combating fading is known as space diversity. Space diversity systems are often implemented as receiver diversity systems, which means that the point-to-point communication system includes a single transmitting antenna transmitting the modulated signal towards a pair of receive antennas. Each receive antenna receives the transmitted signal by a somewhat different path, and the amount of fading differs by each path. The best or strongest demodulated signal is routed to the utilization apparatus, thereby ameliorating the effect of fading. This type of system is effective, especially if the receive antennas are spaced from each other sufficiently so that the signals arriving at the one antenna are uncorrelated with the signals arriving at the other antenna. These considerations are discussed in detail in an article entitled "Space-Diversity Engineering" by A. Vigants, published at pp. 103-142 of the Bell System Technical Journal, Volume 54, No. 1, Jan. 1975. According to Vigants, transmitting diversity is disadvantageous because of the vulnerability of the control signal. However, in communications by multiple hops between towers, alternate transmit and receive diversity can be used. Both transmitting and receiving diversity can be used together, according to Vigants.

A dual transmitting diversity communication system is desired in which the control signals are not vulnerable to fading.

SUMMARY OF THE INVENTION

A space diversity communication system includes a pair of antennas at a first site, each energized at a different frequency by a transmitter. At a second site, a pair of antennas receives the first and second signals from the first site. There are a total of four transmission paths between two transmit antennas and two receive antennas. The two receive antennas couple the signals to four receivers, two for each antenna. Each receiver responds to one of the frequencies to produce a control signal indicative of the strength of the particular signal at its associated antenna. A logic arrangement is coupled to the four receivers and responds to the control signals for determining which one of the two receive antennas is part of the lowest-loss transmission path between the two sites. A data transmitter at the second site produces data signals which are applied to a selector controlled by the logic circuit to route the data signals to that antenna identified as being part of the strongest signal path. The data signals are transmitted from the selected one of the two antennas at the second site back to the first site. The data signals transmitted from the second site are received by both antennas of the first site, and are routed to a pair of receivers and to a logic circuit, which compares the signal strengths of the data signals and selects the strongest for coupling to an utilization arrangement. Thus, the data signals from the second site are coupled to the first site by paths which include the lowest-loss path of the four possible paths. At the first site, a data transmission arrangement couples data to be transmitted to the second site to at least that one of the antennas of the first site which received signals from the second site by way of the strongest transmission path therebetween. In one embodiment of the invention, the data to be transmitted from the first site to the second site is transmitted from the first site by both antennas.

DESCRIPTION OF THE DRAWING

FIG. 2b is a block diagram of the logic circuit of FIG. 2a;

DETAILED DESCRIPTION OF THE INVENTION

Figure 1:
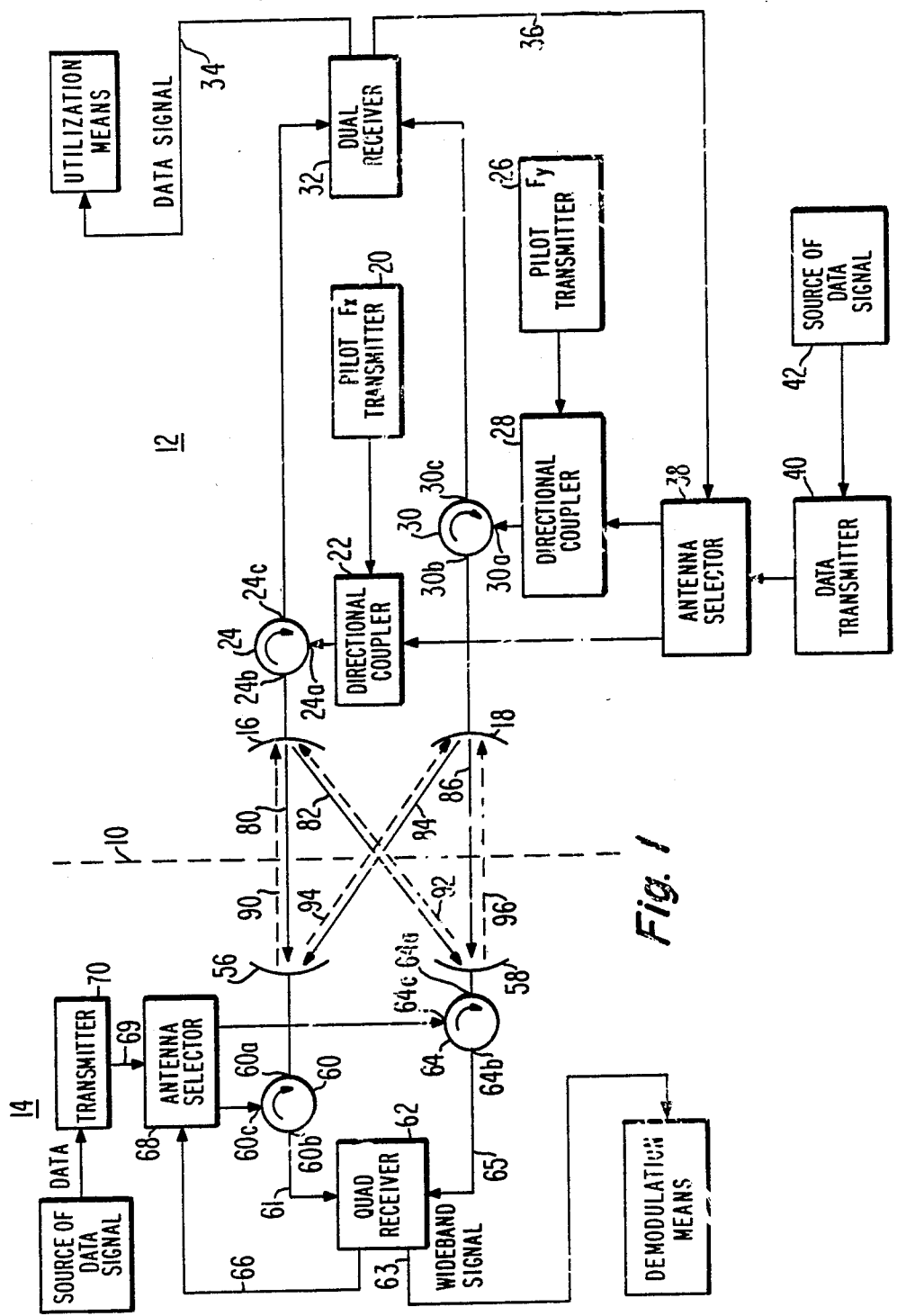
FIG. 1 is a simplified block diagram of a communication arrangement using space diversity at both transmitter-receiver sites according to a first embodiment of the invention.

FIG. 1 is a simplified block diagram of a space diversity communication system. In FIG. 1, a vertical dashed line 10 divides the communication system along the transmission path into a first terminus designated generally as 12 located at a first site and a second terminus designated generally as 14 located at a second site remote from the first site. First terminus 12 transmits and receives signals by means of two antennas 16 and 18. Terminus 14 transmits and receives signals by way of two antennas 56 and 58. A first pilot signal transmitter or signal generator 20 is associated with terminus 12, and produces pilot signals at a first frequency $F_X$ which are applied by way of a directional coupler 22 and terminals 24a and 24b of a circulator 24 to antenna 16 for transmission to terminus 14 at the second site. A circulator as known in the art includes three or more ports or terminals, and signals applied to one of the terminals are primarily coupled to the next adjacent terminal in the direction of circulation, and not to the other terminals. Thus, signals applied from transmitter 20 and directional coupler 22 to terminal 24a of circulator 24 are coupled (low loss) by terminal 24b to antenna 16, and are not coupled (high loss) to terminal 24c. A second pilot signal transmitter or signal generator 26 produces a pilot signal at a second frequency $F_Y$ which is different from frequency $F_X$. The pilot signal produced by pilot transmitter 26 is applied by way of a directional coupler 28 to a terminal 30a of a circulator 30, and from terminal 30b of circulator 30 to antenna 18 for transmission to terminus 14. Signals at frequency $F_Y$ are not coupled (high loss) to terminal 30c of circulator 30.

The transmission of pilot signals between terminals 12 and 14 takes four paths, identified in FIGURE 1 by solid line arrows. A first path, designated 80, extends between antenna 16 and antenna 56, and a second path designated 82 extends between antenna 16 and antenna 58. A third path designated 84 extends between antenna 18 and antenna 56, and a fourth path designated 86 extends between antenna 18 and antenna 58. Consequently, pilot signals at frequencies $F_X$ and $F_Y$ are received at terminus 14 by both antennas 56 and 58.

The two pilot signals, one at $F_X$ and one at $F_Y$, received by antenna 56 are applied by way of terminals 60a and 60b of a circulator 60 to a four-section receiver or quad receiver 62. The pilot signals do not exit from terminal 60c of circulator 60. Similarly, the two pilot signals at frequencies $F_X$ and $F_Y$ received by antenna 58 are applied to input terminal 64a of a circulator 64, and exit from terminal 64b and not from terminal 64c. The pilot signals at $F_X$ and $F_Y$ are applied from terminal 64b of circulator 64 to quad receiver 62. Quad-receiver 62 includes two receiving devices tuned to frequency $F_X$, and two receiving devices tuned to frequency $F_Y$, as described below. Quad-receiver 62 produces control signals representative of the amplitudes of the various pilot signals applied thereto, and processes the signals in a logic circuit to determine which of antennas 56 and 58 is part of that one of the four transmission paths from terminus 12 to terminus 14 which gives the best signal. In general, the best signal would be the one having the greatest amplitude, although other selection criteria, such as signal-to-noise ratio, are possible.

That antenna having the strongest signal is determined to be part of the lowest-loss signal path from terminus 12 to terminus 14. The determination of the antenna in the lowest-loss path is represented by a selection signal which is generated on a conductor 66 for application to an antenna selector 68. Antenna selector 68 is described in more detail below in conjunction with FIG. 3. Antenna selector 68 is functionally equivalent to a single-pole, double-throw switch, in which the common leg is coupled to a data transmitter 70. The selectable legs of the single-pole, double-throw switch are coupled to terminals 60c of circulator 60 and 64c of circulator 64. Antenna selector 68 responds to the state of the selection signal on conductor 66 for routing the data signals from transmitter 70 to one of circulators 60 and 64, depending upon the selection signal. Thus, the data signals from transmitter 70 are routed by antenna selector 68 to that one of circulator 60 and 64 which will circulate the data signals to that one of antennas 56 and 58 which is part of the lowest loss path from terminus 12 to terminus 14. It is assumed that the path having the lowest path loss in one direction (terminus 12 to terminus 14) also has the lowest path loss in the opposite direction (terminus 14 to terminus 12). The other one of antennas 56 and 58, of course, transmits no data signal.

It should be noted that the two pilot signals at frequencies $F_X$ and $F_Y$ are continuously available at quad receiver 62, notwithstanding that the data signal is transmitted from only one of antennas 56 and 58. This provides a substantial degree of reliability in control of the communication system.

There are a total of four transmission paths from terminus 14 to terminus 12. The four signal paths in this direction are identified in FIG. 1 by dashed lines. A first path, extending from antenna 56 to antenna 16, is designated as 90. The path extending from antenna 58 to antenna 16 is designated 92. Similarly, the paths from antennas 56 and 58 to antenna 18 are designated 94 and 96, respectively. The data signals transmitted from terminus 14 arrive at terminus 12 by two of these four paths, since the data signals are transmitted from terminus 14 from only one of antennas 56 and 58. Thus, the data transmission path from terminus 14 to terminus 12 is by way of paths 90 and 94 or 92 and 96.

The data signals at terminus 12 are received by both antennas 16 and 18, no matter which set of paths is taken. The received data signals are applied from antenna 16 to terminal 24b of circulator 24, and are circulated to terminal 24c and not to terminal 24a. The signals from terminal 24c of circulator 24 are applied to an input of a dual receiver 32. The signals received by antenna 18 are applied to a terminal 30b of circulator 30 and are circulated to terminal 30c for application to dual receiver 32. Dual receiver 32 produces control signals representative of the amplitudes of the various data signals applied thereto, and processes the signals in a logic circuit to determine which of antennas 16 and 18 is part of the single best transmission path between terminus 12 and terminus 14. Since transmission of the data signal from terminus 14 was by that one of antennas 56 and 58 which was part of the lowest transmission path, the data signal from antennas 16 and 18 by dual receiver 32 identifies the one signal path having the lowest loss. Dual receiver 32 routes the strongest or otherwise best received data signal to a conductor 34 for application to utilization means (not illustrated). Dual receiver 32 also produces on a conductor 36 a selection signal indicative of that one of antennas 16 and 18 which is part of the lowest loss transmission path between terminus 12 and terminus 14. The selection signal is applied from conductor 36 to an antenna selector 38 similar to antenna selector 68. Data transmitter 40 receives data signal to be transmitted from a source 42, and produces a modulated data signal. The common leg of antenna selector 38 receives the modulated data signal from a transmitter 40 for transmission to terminus 14. The selection signal on conductor 36 controls antenna selector 38 to couple signal from data transmitter 40 to that one of directional couplers 22 and 28 which, together with its associated circulator 24 or 30 couples signal to that one of antennas 16 and 18 which is part of the lowest loss path between terminals 12 and 14.

In this fashion, terminus 12 at the first site continually transmits a pair of signals from two different antennas which are made available at the second terminus which are used to determine at the second terminus which of the receiving antennas is to be supplied with data signal for transmission to the first terminus. At the first terminus, the data signal is received at both antennas and evaluated to determine which of the two antennas should apply the data to the utilization device. Both transmit and receive diversity are used, with reliable control due to the simultaneous availability of both control signals.

Figure 2A:
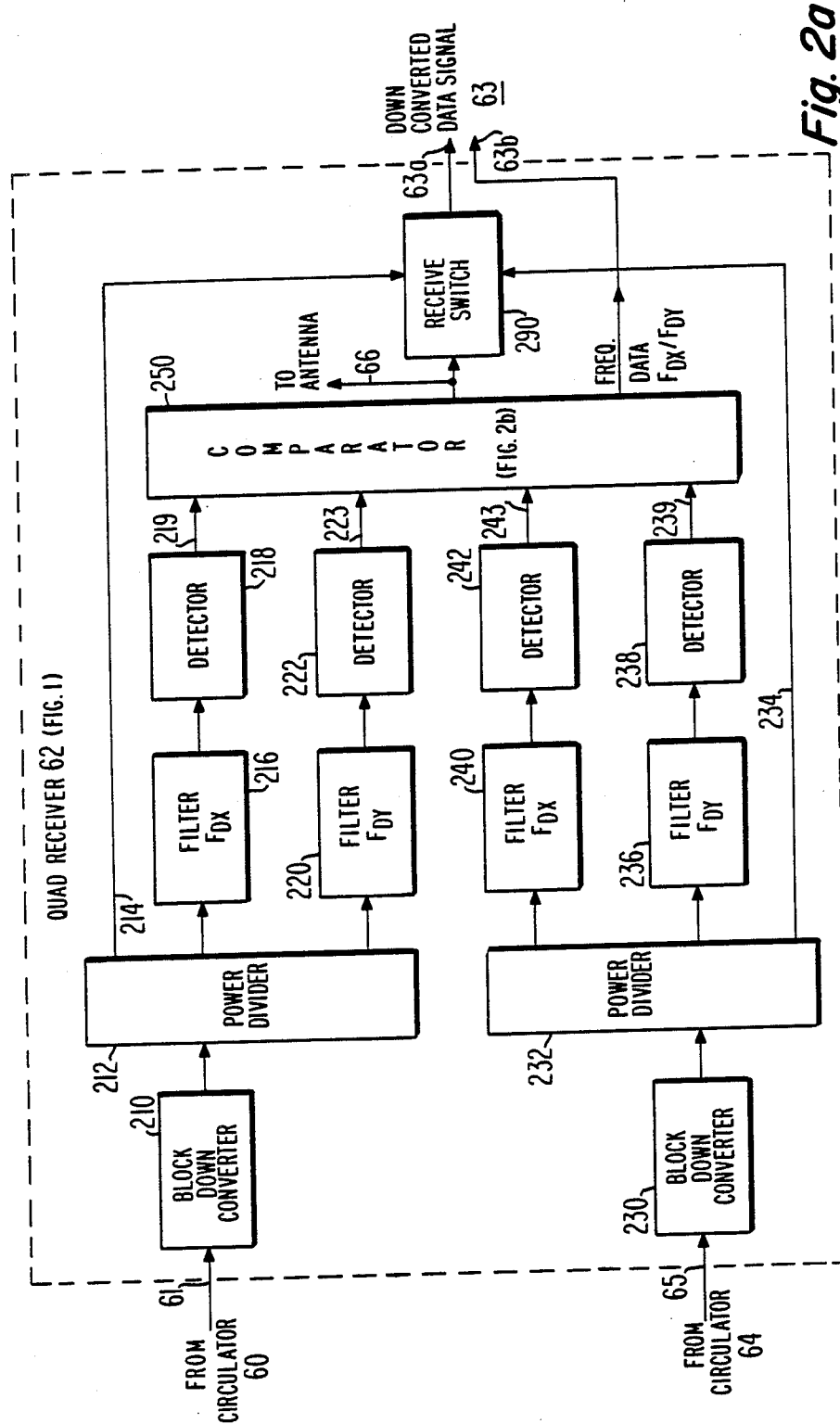
FIG. 2a is a simplified block diagram of a quad receiver located at one terminus or transmitter-receiver site of the system of FIG. 1, including a pair of downconverters for each of two pilot frequencies for block conversion thereof, and a logic circuit for generating an antenna selection signal.

FIG. 2a is a simplified block diagram of quad receiver 62, which is useful in the arrangement of FIG. 1. In FIG. 2a, signals originating from antenna 56 are applied over conductor 61 to a block downconverter 210 which downconverts the received signals from microwave frequencies to a pair of intermediate frequencies related to $F_X$ and $F_Y$. Similarly, microwave signals originating from antenna 58 are applied over conductor 65 to a block downconverter 230, which similarly downconverts the microwave signals to a range of intermediate frequencies. The downconverted signals are applied from downconverter 210 to a power divider 212 which divides the signals into three portions, and the downconverted signals from downconverter 230 are similarly applied to a power divider 232 for division into three portions. A portion of the two signals originating from antenna 56 and downconverted to intermediate frequencies $F_{DX}$ and $F_{DY}$ are coupled onto conductor 214 from power divider 212, and a portion of the two signals originating from antenna 58 and downconverted to the same intermediate frequencies $F_{DX}$ and $F_{DY}$ are coupled to a conductor 234 by power divider 232. The downconverted signals on conductors 214 and 234 are coupled to a multiplex switch 290 which switches one or the other of the pairs of downconverted signals to an output conductor 63a, from which they may be coupled to a demodulator (not illustrated). Switch 290 is controlled by a control signal applied over conductor 66 from a comparator 250. Power divider 212 also couples samples of the downconverted signals originating from antenna 56 to a filter 216 centered on frequency $F_{DX}$, which is the downconverted frequency related to original frequency $F_X$. Another portion of the downconverted signal originating from antenna 56 is applied by power divider 212 to a filter 220 centered on a frequency $F_{DY}$, the downconverted frequency related to frequency $F_Y$. Similarly, the downconverted signal originating from antenna 58 is applied from power divider 232 to a filter 240 centered on frequency $F_{DX}$ and to a filter 236 centered on a frequency $F_{DY}$. The filtered signals produced by filters 216, 220, 236 and 240 are applied to detectors 218, 222, 238 and 242, respectively. Each of the detectors generates a baseband signal or a direct voltage on its output conductor 219, 223, 239 and 243, respectively, which is related to the magnitude of the intermediate-frequency signal applied thereto. These baseband signals are applied to comparator 250, which compares the relative magnitudes of the various signals and decides which of antennas 56 and 58 is part of the lowest-loss path extending between terminus 12 and terminus 14. Comparator 250 produces a selection control signal on conductor 66 which is applied to receive switch 290 for controlling switch 290 to route the downconverted signals originating from either of antennas 56 or 58 to output conductor 63a, and which is also applied to antenna selector 68 (FIG. 1) for controlling the routing of data transmissions from transmitter 70 to one of antennas 56 or 58. Comparator 250 also produces on a conductor 63b a frequency selection control signal indicative of which of the downconverted frequencies $F_{DX}$, $F_{DY}$ from the selected one of antennas 56 and 58 is the stronger. The demodulator (not illustrated) which receives signals over conductor 63a uses this information to demodulate data from the strongest signal.

Figure 2B:
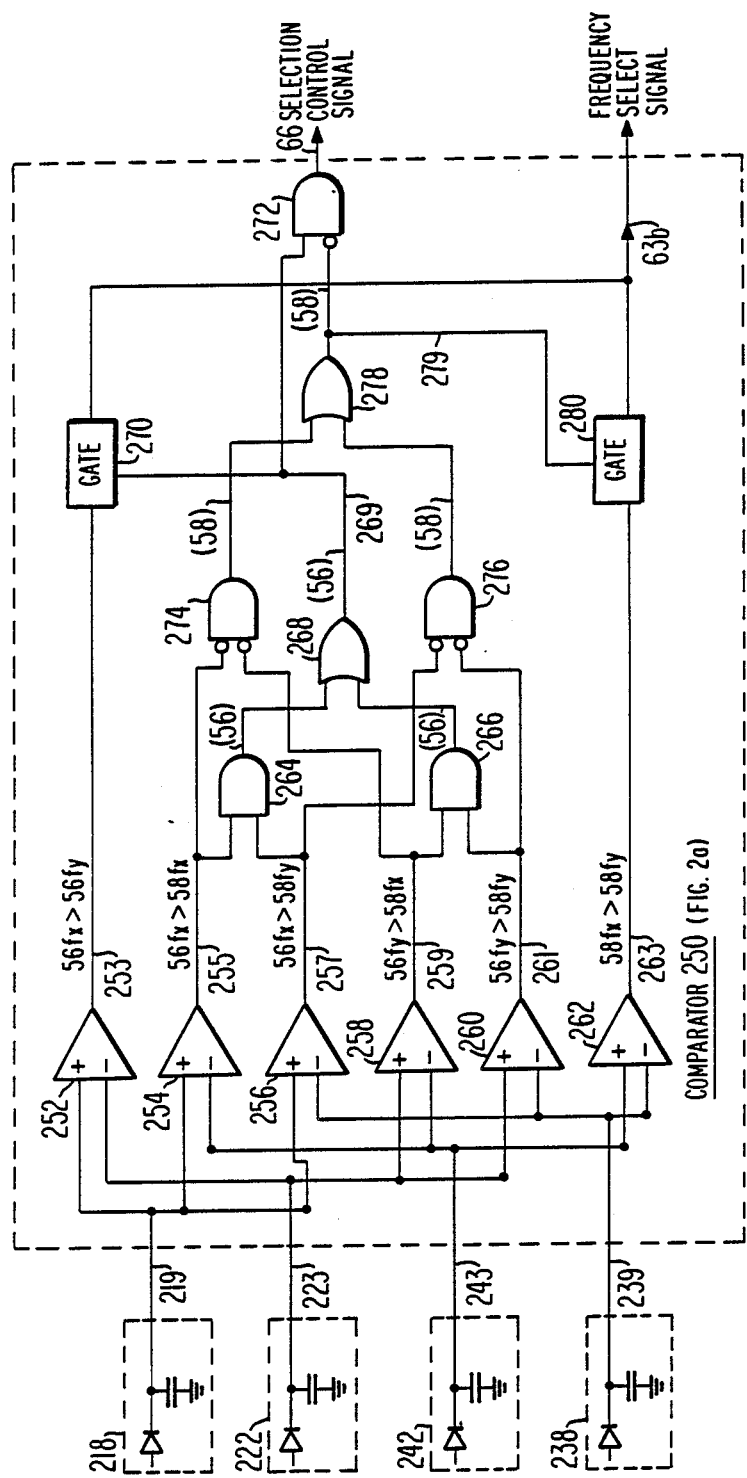

FIG. 2b is a simplified block diagram of a possible arrangement of comparator 250 of FIG. 2a. In FIG. 2b, elements corresponding to those of FIG. 2a are designated by the same reference numeral. In FIG. 2b, the detected signals on conductor 219 (originating with signals at frequency $F_X$ received by antenna 56) are applied to the noninverting input terminals of comparators 252, 254 and 256. The detected signals on conductor 223 (originating with signals at frequency $F_Y$ received by antenna 56) are applied to the inverting input terminal of comparator 252 and to the noninverting input terminals of comparators 258 and 262. The detected signals on conductor 243 ($F_X$, antenna 58) are applied to the inverting input terminals of comparators 254 and 258, and to the noninverting terminal of a comparator 262. The detected signal on conductor 239 ($F_Y$, antenna 58) is applied to the inverting input terminals of comparators 256, 260 and 262. Comparators 252-262 compare the amplitudes of the detected signals in pairs to produce logic signals on their output conductors indicative of the relative strengths of the received signals. For example, comparator 252 compares the received signal strength of the detected downconverted signals at frequencies $F_X$ and $F_Y$ originating from antenna 56, and produces a logic high level on conductor 253 which represents a condition in which, of the two signals received by antenna 56, the signal at frequency $F_X$ is the largest in magnitude. Comparator 262 is coupled to receive signals from conductors 243 and 239 for comparing the magnitudes of the signals at frequencies $F_X$ and $F_Y$ received by antenna 58 for producing on conductor 263 a logic high level indicative that the signal at frequency $F_X$ has a greater magnitude than the signal at frequency $F_Y$, or a logic low if $F_Y$ is greater in magnitude than $F_X$. Comparators 254, 256, 258 and 260 compare various combinations of signals originating from antennas 56 and 58. Comparator 254 compares the signals received at frequency $F_X$ by antennas 56 and 58, and comparator 260 compares signals at frequencies $F_Y$ received by antennas 56 and 58. Comparator 256 compares the signal received by antenna 56 at frequency $F_X$ with the signal received by antenna 58 at frequency $F_Y$, while comparator 258 compares the signal received on antenna 56 at frequency $F_Y$ with the signal received by antenna 58 at frequency $F_X$.

If the signal received by antenna 56 at frequency $F_X$ is greater than either of the signals at frequencies $F_X$ or $F_Y$ received by antenna 58, this indicates that antenna 56 is part of the lowest-loss path from terminus 12 to terminus 14 and should be used for the return path. AND gate 264 is coupled to receive the output signals of comparators 254 and 256, for producing a signal indicative that antenna 56 is part of the lowest loss path between termini 12 and 14 (as indicated by the numeral 56 in parenthesis) Another indication that antenna 56 should be used for the return path occurs if the signal received at frequency $F_Y$ by antenna 56 is stronger than the signals received at frequencies $F_X$ or $F_Y$ on antenna 58. An AND gate 266 is coupled to the outputs of comparators 258 and 260 for producing another indication that antenna 56 should be used. Thus, the outputs of either AND gates 264 or 266 are an indication that antenna 56 should be used. These outputs are ORed together by an OR gate 268 to produce a combined "antenna 56 select" signal on a conductor 269 indicative that antenna 56 should be used. The signal on conductor 269 is applied to a control input terminal of transmission gate 270 and to a noninverting input terminal of an AND gate 272. The output terminal of AND gate 272 produces the selection control signal for control of the antenna switches. Thus, when the relative magnitudes of the signals are such as to indicate that antenna 56 should be used, a logic high level is produced on conductor 269 which is coupled to AND gate 272 for generating a control signal on conductor 66 for application to antenna selector 68 (FIG. 1), and which is also applied to transmission gate 270 to couple the output of comparator 252 to conductor 63b. As mentioned, the signal on conductor 63b is representative of which of the two signal frequencies $F_X$ or $F_Y$ have the greatest magnitude, which can be used by a signal demodulator to select the best signal frequency for demodulation of data.

In order for the signal on conductor 66 to indicate that antenna 58 is part of the lowest loss path from terminus 12 to terminus 14, either the signal at frequency $F_X$ or the signal at frequency $F_Y$ as received by antenna 58 must be larger than any other signals. An AND gate 274 has inverting input terminals coupled to the outputs of comparators 254 and 258 for producing a logic high output when signal at frequency $F_X$ received by antenna 58 is larger than either signal at frequency $F_X$ or $F_Y$ received by antenna 56. A similar comparator 276 has inverting inputs connected to the outputs of comparators 256 and 260 for producing a logic high indication when a signal at frequency $F_Y$ received by antenna 58 is larger than signals at frequencies $F_X$ or $F_Y$ received at antenna 56. Thus, a logic high output from either AND gate 274 or 276 indicates that the lowest loss transmission path from terminus 12 to terminus 14 includes antenna 58. The outputs of AND gates 274 and 276 are ORed together in an OR gate 278 to produce a combined "antenna 58 select" signal on a conductor 279 which is aplied to an inverting input of AND gate 272 to aid in generating the select control signal, and which is also applied to a control input terminal of transmission gate 280 for enabling thereof. Thus, when OR gate 278 indicates by a logic high level that antenna 58 should be used, transmission gate 280 is enabled to produce a frequency selection signal on conductor 63b, and AND gate 272 produces a logic low level on conductor 66 for switching of receive switch 290 (FIG. 2b) and antenna selector switch 68 (FIG. 1) to antenna 58.

Figure 3:
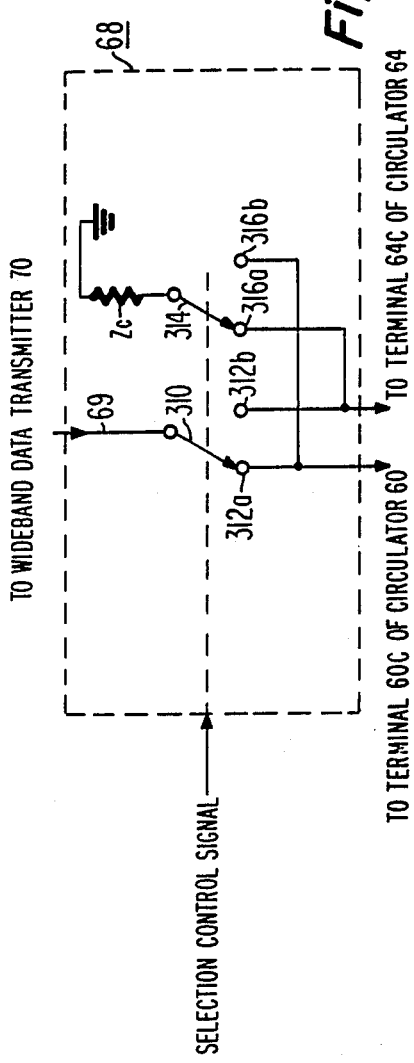
FIG. 3 is a simplified diagram of an antenna selector useful in the arrangement of FIG. 1 for responding to the antenna selection signal generated by the arrangement of FIG. 2 for switching a data transmitter to one of the antennas.

FIG. 3 is a schematic diagram of antenna selector 68 of FIG. 1. In FIG. 3, conductor 69 is coupled to receive modulated data signals from transmitter 70 and to apply them to a common movable terminal or wiper 310. Wiper 310 is controllable in response to the selection signal applied over conductor 66 to contact either a first terminal 312a which is connected to terminal 60c of circulator 60, or to contact a second terminal 312b which is connected to terminal 64c of circulator 64. Depending upon the state of the selection control signal on conductor 66, the data transmission from transmitter 70 is applied to either terminal 60c of circulator 60 or terminal 64c of circulator 64. During those times in which a circulator terminal is not connected to receive data transmission signal, it should be terminated in a characteristic impedance, as known in the art. For this purpose, a second movable wiper 314 is ganged with movable wiper 310 for connecting an impedance $Z_C$ to one of terminals 316a or 316b. Such selection switches are well known and within the skill of those in the microwave communication arts.

Figure 4:
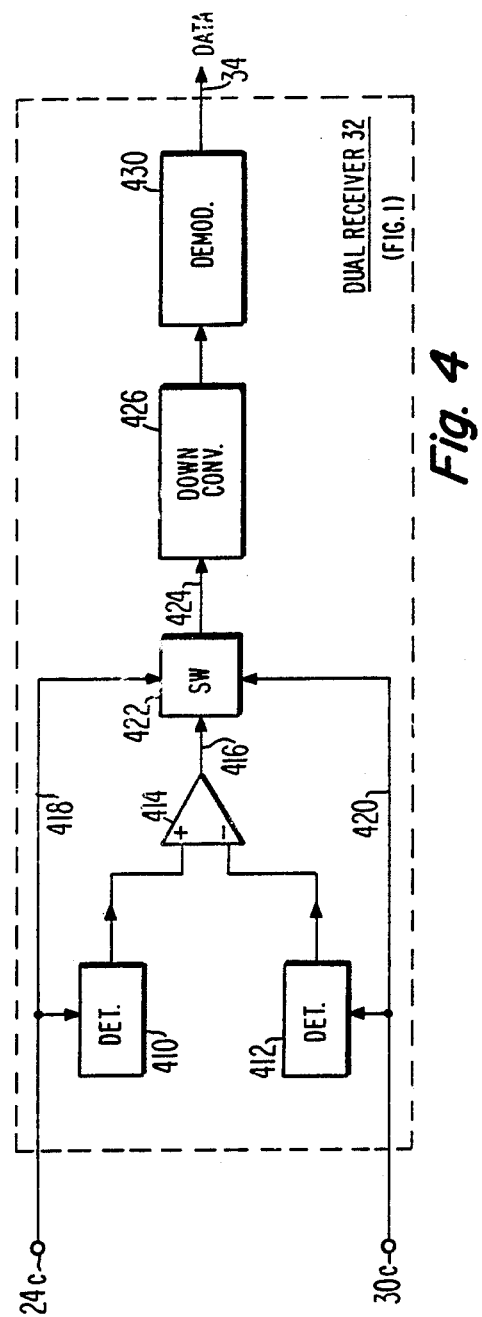
FIG. 4 is a simplified block diagram of a dual receiver useful at a second terminus of FIG. 1, for selecting the stronger data signal and for generating an antenna selection signal.

FIG. 4 is a simplified diagram of a dual receiver 32 useful at terminus 12 of FIG. 1 for selecting the stronger of the two received signals transmitted from terminus 14. In FIG. 4, dual receiver 32 includes a first detector 410 coupled by a conductor 418 to receive signal from terminal 24c of directional coupler 24, and a second detector 412 coupled by a conductor 420 to receive signal from terminal 30c of directional coupler 30. As mentioned, the signals received by detectors 410 and 412 are the same signal, but may have different amplitudes by virtue of traversing different paths from the one selected antenna at terminus 14 to the two antennas of terminus 14. The detected signals produced by detectors 410 and 412 are compared in a comparator 414, which produces a signal on conductor 416 which represents by a high logic level that the signal from circulator 24 is the stronger of the two, and by a low logic level that the signal from circulator 30 is the stronger. The signals from circulators 24 and 30 are also applied over conductors 418 and 420, respectively, to a switch 422 which is controlled by the output signal of comparator 414 to select the stronger signal and to couple the stronger signal by a conductor 424 to a downconverter 426. Downconverter 426 downconverts the signal and applies it to a demodulator 430 which produces the data signal on conductor 34.

Figure 5:
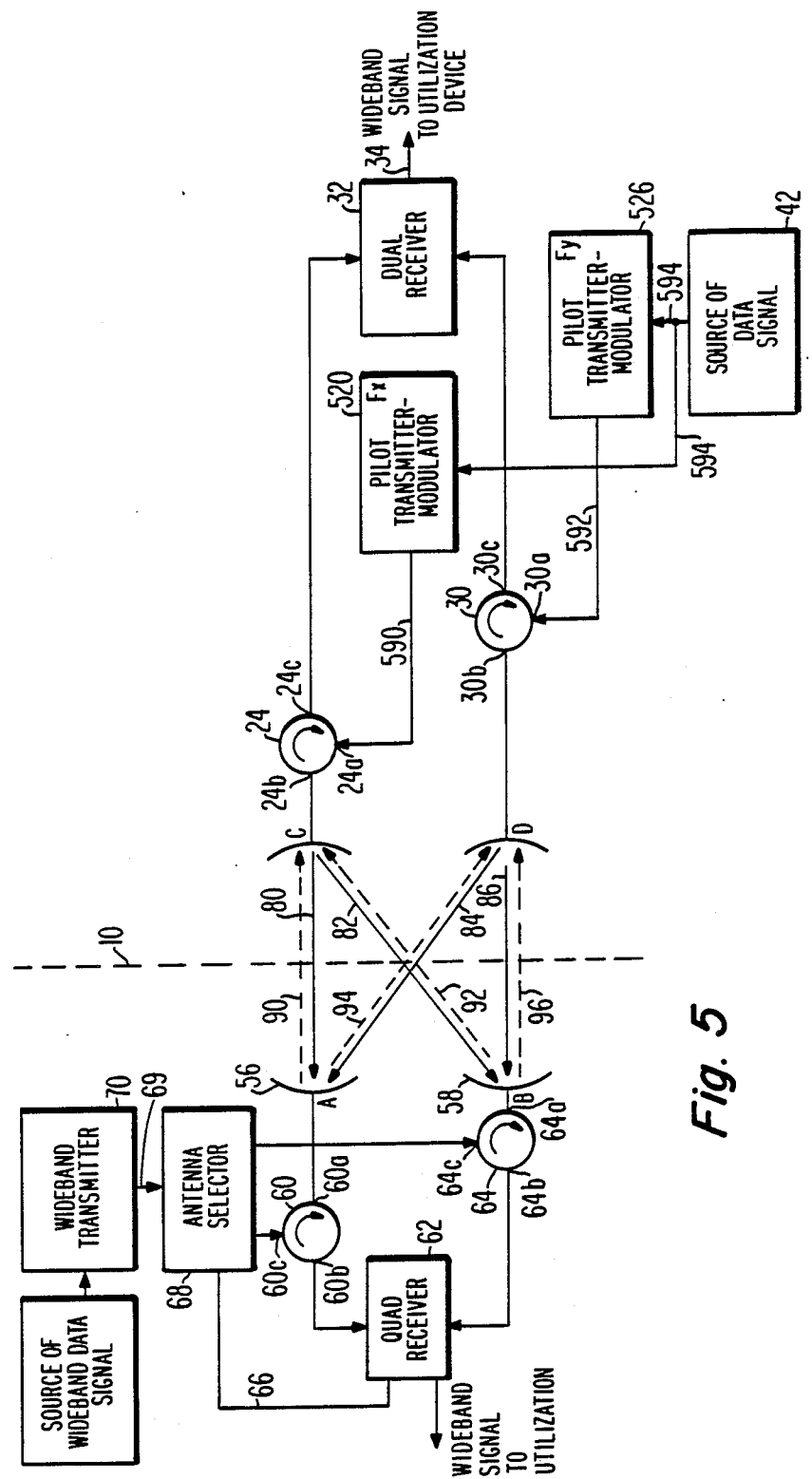
FIG. 5 is a simplified block diagram of a communication arrangement according to a second embodiment of the invention.

FIG. 5 is a simplified block diagram of a communication arrangement according to a second embodiment of the invention. FIG. 5 is similar to FIG. 1, and elements of FIG. 5 corresponding to those of FIG. 1 are designated by the same reference numeral. FIG. 5 differs from FIG. 1, generally speaking, in that data signals are transmitted from terminus 12 to terminus 14 by modulating the pilot carriers rather than by transmitting a separate modulated signal. For this purpose, the arrangement of FIG. 5 couples a pilot transmitter-modulator 520 directly to terminal 24a of circulator 24 by means of a conductor 590, and couples a pilot transmitter-modulator 526 having a carrier frequency $F_Y$ to terminal 30a of circulator 30 by a conductor 592. Directional couplers 22 and 28, antenna selector 38 and data transmitter 40 of FIG. 1 are eliminated in the arrangement of FIG. 5. Source 42 of data signal is connected by conductors 594 to both transmitter-modulators 520 and 526.

Figures 6A, 6B:
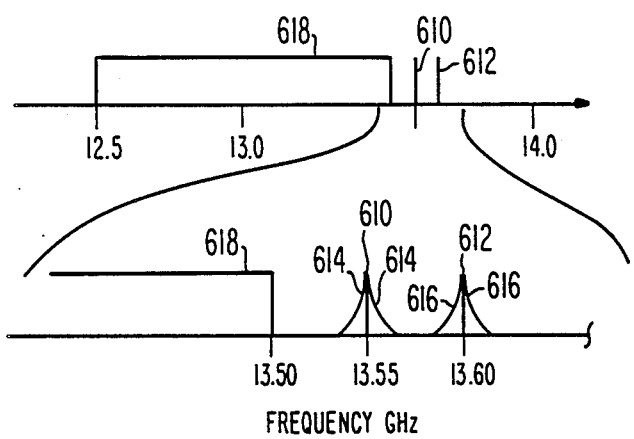
FIG. 6a and 6b are a frequency-amplitude spectrum, and an expanded portion thereof, respectively, useful for explaining the operating conditions of the arrangement of FIG. 5.

FIG. 6a is a frequency-amplitude spectrum illustrating a first modulated pilot carrier 610 and a second modulated carrier 612, both at a frequency above 13.5 GHz, which are generated by transmitter-modulators 520 and 526, respectively of FIG. 5. Modulated pilot carrier 610 is centered at frequency $F_X$, which can be seen in FIG. 6b to be 13.55 Ghz, and pilot carrier 612 is centered at frequency $F_Y$, which is approximately 13.60 GHz. In a particular embodiment of the invention, the pilot carrier may be modulated by data at a rate of 8.64 megabits/second causing sideband illustrated as 614 to be generated about pilot carrier 610 and causing identical sidebands illustrated as 616 to be generated about pilot carrier 612. In FIG. 6a, the data signal produced by transmitter 70 of FIG. 5 is illustrated as 618. This is a wideband signal having a bandwidth of approximately 1 GHz. The relatively narrow bandwidth modulation of pilot carriers 610 and 612 does not materially affect their function of controlling the switching of antenna selector 68.

Other embodiments of the invention will be apparent to those skilled in the art. For example, there may be more than two antennas and associated receivers at each site.

What is claimed is:

1. A space-diversity communication system, comprising:

first and second spaced-apart antennas located at a first site and aimed towards third and fourth spaced-apart antennas located at a second site remote from said first site;

first transmitting means located at said first site, said first transmitting means being coupled to said first antenna for causing said first antenna to transmit a relatively narrowband first transmission signal at a first frequency towards said third and fourth antennas;

second transmitting means located at said first site, said second transmitting means being coupled to said second antenna for causing said second antenna to transmit a relatively narrowband second transmission signal at a second frequency towards said third and fourth antennas;

first and second receivers located at said second site, said first and second receivers being coupled to said third and fourth antennas, respectively, and tuned to said first frequency for receiving said first transmission signal arriving at said third and fourth antennas by different paths, and for generating first and second control signals, respectively, in response to the amplitudes of said first transmission signal as received;

third and fourth receivers located at said second site, said third and fourth receivers being coupled to said third and fourth antennas, respectively, and tuned to said second frequency for receiving said second transmission signal arriving at said third and fourth antennas by different paths, and for generating third and fourth control signals, respectively, in response to the amplitudes of said second transmission signal as received;

first logic means coupled to said first, second, third and fourth receivers, and responsive to said first, second, third and fourth control signals for determining which of said third and fourth antennas is a part of the lowest-loss signal path between said first and second sites, and for generating a first selection control signal in response thereto;

first data transmission means located at said second site, said first data transmission means generating a first data transmission signal including first data for transmission to said first site;

first controllable coupling means located at said second site, and coupled to said first data transmission means, said first logic means and to said third and fourth antennas for selectively coupling said first data transmission signal to one of said third and fourth antennas in response to said first selection control signal, whereby said first data transmission signal is received by different paths, one of which is said lowest-loss signal path, at said first and second antennas;

fifth and sixth receivers located at said first site, said fifth and sixth receivers being coupled to said first data transmission signal by said different paths, and for generating fifth and sixth control signals, respectively, in response to the amplitude of said first data transmission signal as received;

second logic means coupled to said fifth and sixth receivers for receiving said fifth and sixth control signals therefrom, for determining which of said first and second antennas is a part of said lowest-loss signal path between said first and second sites, and for generating a second selection control signal in response thereto;

second controllable coupling means located at said first site, and coupled to said second logic means and adapted to be coupled to utilization means for selecting for use by said utilization means said first data transmission signal received by that one of said first and second antennas which is a part of said lowest-loss signal path;

second data transmission means located at said first site and coupled to at least one of said first and second antennas for transmitting said second data by way of said at least one of said first and second antennas; and demodulation means located at said second site, said demodulation means being coupled to said first controllable coupling means for receiving said second data by way of that one of said third and fourth antennas which is part of said lowest-loss signal path.

2. A system according to claim 1 wherein said second data transmission means comprises:

modulation means coupled to said first and second transmitting means for modulating both said first and second transmission signals with said second data.

3. A system according to claim 2 further comprising:

first circulating means for coupling said first transmission signal from said first transmitting means to said first antenna and not to said fifth receiver, and for coupling said first data transmission signal from said first antenna to said fifth receiver and not to said first transmitting means; and second circulating means for coupling said second transmission signal from said second transmitting means to said second antenna and not to said sixth receiver, and for coupling said first data transmission signal from said second antenna to said sixth receiver and not to said second transmitting means.

4. A system according to claim 1 wherein said second data transmission means comprises spectrum generating means for generating a modulated signal including said second data, said modulated signal being independent of said first and second transmission signals.

5. A system according to claim 4 further comprising controllable antenna coupling means for coupling said spectrum generating means to at least one of said first or second antennas for coupling said modulated signal to that one of said first and second antennas which is a part of said lowest-loss signal path for transmission between said first and second sites.

6. A system according to claim 5 wherein said demodulation means comprises independent demodulating means coupled for receiving said modulated signal including said second data for demodulating said modulated signal for recovering said second data.

7. A system according to claim 5 wherein said controllable antenna coupling means comprises:
first circulating means coupled to said first antenna, to said fifth receiver and to a first port, for coupling signals from said first port to said first antenna and not to said fifth receiver, and for coupling said first data transmission signal from said first antenna to said fifth receiver and not to said first port;
second circulating means coupled to said second antenna, to said sixth receiver and to a second port, for coupling signals between said second port to said second antenna and not to said sixth receiver, and for coupling said first data transmission signal from said second antenna to said sixth receiver and not to said second port; and
signal transfer means coupled to said spectrum generating means, to said first and second ports, and to said second logic means for coupling said modulated signal to that one of said first and second ports which communicates with that one of said first and second antennas which is identified by said second selection control signal as part of said lowest loss signal path between said first and second sites.

8. A method for communication between first and second sites, comprising the steps of:
generating a first transmission signal at a first site, said first transmission signal having a first frequency;
generating a second transmission signal at said first site, said second transmission signal having a second frequency;
coupling said first transmission signal to a first antenna located at said first site for causing said first antenna to radiate said first transmission signal;
coupling said second transmission signal to a second antenna located at said first site for causing said second antenna to radiate said second transmission signal;
receiving said first and second transmission signals at a third antenna located at a second site remote from said first site;
receiving said first and second transmission signals at a fourth antenna located at said second site;
generating separate control signals representing the amplitudes of said first and second transmission signals received by said third and fourth antennas;
processing said separate control signals to generate a first selection control signal representative of that one of said third and fourth antennas which is part of the lowest-loss transmission path between said first and second sites;
generating a first data transmission signal including first data at said second site;
coupling said first data transmission signal, under the control of said first selection control signal, to that one of said third and fourth antennas which is part of said lowest-loss transmission path between said first and second site;
receiving said first data transmission signal from said first and second antennas at said first site;
generating third and fourth control signals in response to the amplitude of said first data transmission signal received by said first and second antennas, respectively;
generating a second selection control signal from said third and fourth control signals, said second selection control signal representing that one of said first and second antennas which is part of said lowest-loss transmission path between said first and second sites;
coupling said first data transmission signal, under control of said second selection control signal, to utilization means from that one of said first and second antennas represented by said second selection control signal;
generating a second data transmission signal including second data at said first site;
coupling said second data transmission signal to at least that one of said first and second antennas identified by said second selection control signal for causing said second data transmission signal to be transmitted to said second site; and
at said second site, receiving said second data transmission signal from that one of said third and fourth antennas selected by said first selection signal.

9. A method according to claim 8 wherein said step of generating second data transmission signal comprises the step of modulating said first and second transmission signals with said second data to form second data transmission signal sidebands associated with each of said first and second transmission signals.

10. A method according to claim 9 wherein said step of coupling said second data transmission signal includes the steps of:
coupling said first transmission signal and its associated second data transmission signal sidebands to said first antenna by way of a circulator; and
coupling said second transmission signal and its associated second data transmission signal sidebands to said second antenna by way of a circulator.

11. A method according to claim 8 wherein said step of coupling said second data transmission signal includes the steps of:
generating first and second selectable signal paths coupled to said first and second antennas, respectively, and also coupled to receive said second data transmission signal; and
selecting between said first and second selectable signal paths in response to said second selection control signal.

* * * * *

UNITED STATES PATENT AND TRADEMARK OFFICE
CERTIFICATE OF CORRECTION

PATENT NO. : 4,710,944

DATED : December 1, 1987

INVENTOR(S) : Edward J. Nossen

It is certified that error appears in the above-identified patent and that said Letters Patent is hereby corrected as shown below:

Column 10, line 10, insert after "first" --and second antennas, respectively, for receiving said first--.

Signed and Sealed this

Twenty-sixth Day of April, 1988

Attest:

DONALD J. QUIGG

*Attesting Officer*      *Commissioner of Patents and Trademarks*